United States Patent
Van Bergen (10) Patent No.: US 10,273,084 B2
(45) Date of Patent: Apr. 30, 2019

(54) STORAGE RACK WITH MULTI-DIRECTION SHUTTLE

(71) Applicant: Dematic NV, Zwijndrecht (BE)

(72) Inventor: Noë Van Bergen, Antwerp (BE)

(73) Assignee: Dematic NV, Zwijndrecht (BE)

( * ) Notice: Subject to any disclaimer, the term of this patent is extended or adjusted under 35 U.S.C. 154(b) by 0 days.

(21) Appl. No.: 15/571,176

(22) PCT Filed: Apr. 18, 2016

(86) PCT No.: PCT/EP2016/058492
§ 371 (c)(1),
(2) Date: Nov. 1, 2017

(87) PCT Pub. No.: WO2016/177555
PCT Pub. Date: Nov. 10, 2016

(65) Prior Publication Data
US 2018/0186568 A1    Jul. 5, 2018

(30) Foreign Application Priority Data
May 4, 2015 (EP) .................................... 15166258

(51) Int. Cl.
*B65G 1/04* (2006.01)
(52) U.S. Cl.
CPC ................. *B65G 1/0492* (2013.01)
(58) Field of Classification Search
CPC ................................................. B65G 1/0492
See application file for complete search history.

(56) References Cited

U.S. PATENT DOCUMENTS

| | | |
|---|---|---|
| 5,370,492 A | 12/1994 | Gleyze et al. |
| 6,213,025 B1 | 4/2001 | Sauerwein et al. |
| 7,381,022 B1 | 6/2008 | King |
| 9,598,239 B2 * | 3/2017 | Lert, Jr. ............... B65G 1/0492 |

(Continued)

FOREIGN PATENT DOCUMENTS

| | | |
|---|---|---|
| CN | 203268812 U | 11/2013 |
| DE | 8210739 U1 | 1/1988 |

(Continued)

OTHER PUBLICATIONS

Extended European Search Report from EP Application No. EP 15166258, dated Oct. 28, 2015.

(Continued)

*Primary Examiner* — Kaitlin S Joerger
(74) *Attorney, Agent, or Firm* — Workman Nydegger (57) ABSTRACT

Embodiments relate to a storage rack for an automated warehouse storage system comprising a storage track for accessing storage space by a multi-directional load carrying shuttle; and an aisle track comprising a track crossing for accessing the storage track. The aisle track is decoupled from the storage track by a discontinuity between the track crossing and the storage track. The track crossing bends downwards towards the discontinuity for engaging a first and third tread of the multi-directional load carrying shuttle with the storage track in a continuous manner and/or wherein the storage track bends downwards towards the discontinuity for engaging the first and third tread with the storage track in a continuous manner.

10 Claims, 6 Drawing Sheets

(56) References Cited

U.S. PATENT DOCUMENTS

| | | | |
|---|---|---|---|
| 2005/0118003 A1 | 6/2005 | Mitchell et al. | |
| 2014/0288696 A1* | 9/2014 | Lert | |
| 2016/0229630 A1* | 8/2016 | Gebhardt | B65G 1/0492 |
| 2016/0311616 A1* | 10/2016 | Lindblom | B65G 1/0414 |
| 2017/0101263 A1* | 4/2017 | Schroer | B65G 1/0407 |
| 2017/0121110 A1* | 5/2017 | Zombori | B65G 1/1375 |
| 2017/0334643 A1* | 11/2017 | Itoh | B65G 1/0492 |

FOREIGN PATENT DOCUMENTS

| | | |
|---|---|---|
| DE | 19626966 A1 | 1/1998 |
| FR | 2685306 A1 | 6/1993 |
| FR | 2730715 A1 | 8/1996 |
| JP | S53160190 U | 12/1978 |
| JP | S59217591 A | 12/1984 |
| WO | 200507789 A1 | 8/2005 |

OTHER PUBLICATIONS

International Search Report from PCT Application No. PCT/EP2016/058492, dated Jun. 21, 2016.
European Search Report from EP Application No. EP 15 166 258.2, dated Mar. 22, 2018.

* cited by examiner

STORAGE RACK WITH MULTI-DIRECTION SHUTTLE

FIELD OF THE INVENTION

The present invention generally relates to automated warehouses. More particularly, it relates to automated warehouses where loads, for example pallets, are fetched from and delivered to storage locations in a storage rack by multi-directional warehouse shuttles or satellites. Such shuttles are capable of carrying the loads along tracks in different directions within levels of the storage racks in the warehouse. The tracks typically comprise two rails.

On a certain level of the storage rack, the shuttle moves along an aisle track giving access to a plurality of storage tracks. Typically, the storage tracks are arranged perpendicular to the aisle track. To move onto a storage track, a shuttle stops at a track crossing in the aisle track and then moves by the track crossing onto the storage track. In the storage track, when fetching a load, the shuttle may move underneath the load, lift the load by a moveable top platform on the shuttle, and return with the load in order to store it at another location or to bring it outside the storage rack for further distribution. In order to move underneath the loads, the rails of the storage track are typically embodied as Z- or C-profiles wherein the loads are stored on the upper horizontal member of the profile and the shuttle rides on the lower horizontal member of the Z- or C-profile.

As storage racks have different storage levels, the loads may be moved between levels by an elevator that moves the loads or the shuttle together with the loads between the levels.

For the sake of clarity and as common in warehouse systems, throughout the disclosure the vertical direction is also referred to as the y-direction, the direction of the aisle track is referred to as the x-direction and the direction of the storage track is referred to as the z-direction.

BACKGROUND OF THE INVENTION

A first type of shuttle based automated warehouses uses one-directional shuttles to fetch and store pallets from and to the storage rows. To access the storage rows on all levels and in all positions within the aisle, the shuttle is put onto the appropriate storage row by a forklift. Alternatively, an automated stacker crane brings the shuttle to the appropriate level and position, i.e., the stacker crane moves the loads along the y- and x-direction. At ground level, the loads are then unloaded from the stacker crane for further distribution.

Automated stacker cranes are however expensive and typically only one crane at a time can move over the whole storage rack. Furthermore, due to the large weight of the stacker cranes, they have a high power consumption. These issues were solved by the introduction of two-directional shuttle systems. In such systems, on each level, shuttles move both along an aisle track, i.e., along the x-direction, and from the aisle track onto the storage tracks, i.e., along the y-direction. An elevator then exchanges the load between aisles on different levels. With the two-directional shuttle systems, different shuttles can move simultaneously on all levels.

In DE8210739U1 such a two directional shuttle system is disclosed. The two-directional movement is achieved by a first shuttle that moves along the aisle track and a second shuttle that moves along the storage track. This system is also referred to as a dual shuttle system. When moving along the aisle track, this second shuttle resides on top of the first shuttle. This way, the combination of the two one-directional shuttles achieves the two directional movement. A first disadvantage of this system is that it is expensive and complex as two separate compatible shuttles must be foreseen, each having their own batteries and motors. A second disadvantage is that, while the top shuttle resides in the storage track, the lower shuttle blocks the aisle track. Therefore, typically only one such shuttle system can be used per storage level.

This problem is overcome by the two-directional shuttle system as disclosed in CN203268812U. This single shuttle comprises two sets of wheels, one set for riding on the aisle tracks and one set for riding on the storage track. Each of the sets can be retracted when the other set is used. A disadvantage of this system is that the use of a single two-directional shuttle with two sets of wheels requires strict tolerances on the alignment between the aisle and storage tracks. The increased weight and thus cost of the storage rack in order to meet these stricter tolerances may however outweigh the initial advantage of avoiding the dual shuttle system.

SUMMARY OF THE INVENTION

It is an object of the present invention to overcome the above disadvantages and provide a warehouse storage system with a two-directional shuttle that puts less stringent requirements on the alignment of the aisle and storage tracks.

This object is achieved by an automated warehouse storage system comprising a storage track for accessing storage space, an aisle track comprising a track crossing for accessing this storage track and a multi-directional load carrying shuttle adapted to ride on both the storage track and the aisle track. The aisle track is decoupled from the storage track by a discontinuity between the track crossing and the storage track. The shuttle comprises at least four wheel treads per side for driving this shuttle along a direction of the storage track. The four wheel treads are further configured such that, when riding from the crossing onto the storage track, a first tread of these four treads engages with the storage track before a second tread disengages with the track crossing thereby overcoming the discontinuity and such that a third tread engages with the storage track before a fourth tread disengages with the track crossing. The track crossing further bends downwards towards the discontinuity for engaging the first and third tread with the storage track in a continuous manner. Alternatively or complimentary, the storage track bends downwards towards the discontinuity for engaging the first and third tread with the storage track in a continuous manner.

The single shuttle is thus adapted to travel on both the aisle track and storage track that are no longer connected to each other via the track crossing. The track crossing comprises the rails that extend away from the aisle track towards the rails of the storage track. Preferably, these cross rails extent substantially perpendicularly from the aisle rails. Typically, an opening is foreseen in the sidewalls of the aisle rails at the point where these cross rails are attached.

When the shuttle is facing the track crossing, it can initiate its movement on this track crossing towards the storage track. To ride on the track crossing and storage track, the shuttle comprises at least two wheels on each side, i.e. two wheels for each rail of the track crossing or storage track. When riding on the track crossing, the shuttle uses at least a second and fourth tread on different wheels and this on each side of the shuttle. Similarly, when riding on the storage track, the shuttle uses at least a first and third tread on different wheels and this on each side of the shuttle. The different wheel treads do not overlap, but, depending on the specific arrangement, the first and second wheel treads may be located on the same wheel, on wheels on the same wheel axis or on wheels on a different axis. Similarly, the third and fourth wheel treads may be located on the same wheel, on wheels on the same wheel axis or on wheels on a different axis.

In the current disclosure, a wheel tread is defined as the surface on the wheel's circumference that makes contact with a certain rail, i.e., a rail of the aisle track, track crossing or storage track. One wheel may thus have different treads when one part of the wheel is used on one rail and another part of the wheel is used on another rail.

It is an advantage that there is a discontinuity between the track crossing and the storage track as this relaxes the tolerances in placement of the storage and aisle rails. The rails are thus not connected to each other which causes the discontinuity. Therefore, a small deviation between the rails will not result in large strains in the storage structure.

It is a further advantage that the shuttle can move smoothly and continuously over the discontinuity by the specific arrangement of the different wheel treads. Even if there is a misalignment between the rails, there is no risk that the shuttle's wheels get stuck in or get blocked by the discontinuity.

At the end of the track crossing, the shuttle will ride shortly downwards before engaging with the storage track, i.e., more downwards relative to the initial level of the track crossing. This way, a smooth transition is achieved between the track crossing and the storage track. Even when there is a vertical offset between the track crossing and storage track, a smooth transition is still accomplished.

This also guarantees a smooth transition in the opposite direction, i.e., when the shuttle moves from the storage track to the track crossing.

Alternatively or complimentary, the storage track will thus bend downwards towards the discontinuity for engaging the first and third tread with the storage track in a continuous manner.

In other words, in the beginning of the storage track, the shuttle will ride shortly upwards, i.e., more upwards then when the shuttle was still on the track crossing. Also here, a smooth transition is achieved between the track crossing and the storage track. Event when there is a vertical offset between the track crossing and storage track, a smooth transition is still accomplished.

According to a first embodiment the shuttle comprises at least four wheels per side each comprising a respective tread of the four wheel treads. These four wheels are configured in line such that the shuttle rides on the four wheels on both a rail of the track crossing and a rail of the storage track.

In other words, the wheel treads are arranged on different wheels that are placed one after the other on each side of the shuttle such that all of them make contact with the rails when on the track crossing or on the storage track. The first and fourth wheels and thus wheel treads are then positioned on the outside and the second and third wheels and thus wheel treads are then positioned on the inside. By this arrangement of the wheel treads, the cross rails and the storage rails should follow the same line, i.e., be at the same height and equally spaced apart.

A particular advantage of this arrangement is that the shuttle is supported by all four wheels on the rails of the track crossing and storage track. This provides a better weight distribution of the load's weight onto the rails.

According to a second embodiment, the shuttle is configured to ride on the storage track by the first tread and third tread and to ride on the rail crossing by the second tread and the fourth tread.

In other words, when the shuttle is on the track crossing, it is only supported by the second and fourth tread and when it is riding on the storage track, it is only supported by the first and third tread. By this arrangement, there is no need that the cross rails are on the same line as the storage rails. Depending on the arrangement of the wheels a difference in height between the rails or in rail spacing may be used. This has the further advantage that a larger deviation in placement can be tolerated than in the first embodiment.

Advantageously, the track crossing and storage track are overlapping along a direction of the storage track.

By doing so, the tolerance may be further relaxed and a smoother transition when overcoming the discontinuity is achieved as the transition region between the cross tracks and the storage tracks is extended.

According to a further embodiment of the second embodiment the shuttle comprises at least four wheels per side each comprising a respective tread of the four wheel treads. A first and third wheel comprising respectively the first and third tread are positioned higher on the shuttle than a second and fourth wheel comprising respectively the second and fourth tread.

By this arrangement, the tolerance in height between the cross track and the storage track is determined by the height difference between the wheels.

Furthermore, when on the storage track, the shuttle will ride on the higher wheels and part of the shuttle will thus be positioned under the storage rail. In storage racks, the storage rail is typically a profile, e.g., a Z- or C-profile, comprising a vertical member, a higher horizontal member and a lower horizontal member. The shuttle then rides on the lower horizontal member of the profile underneath a pallet stored on the higher horizontal member of the profile in order to lift and transport the pallet. The vertical member provides the spacing between the two horizontal members. Because of the higher position of the wheels, only the part between the first and third wheel and the top of the shuttle needs to be overcome by the vertical member and, thus, the vertical member can be made smaller thereby saving material cost.

According to a further alternative embodiment of the second embodiment, the shuttle comprises two wheel axes each comprising one or more wheels. The first and second tread are then on the one or more wheels of a first wheel axis and the third and fourth tread are on the one or more wheels of a second wheel axis.

The shuttle thus rides by the same wheel axes on the track crossing and the storage track, but the wheel treads reside next to each other on an axis. Consequently, the track width of the track crossing and the storage track will be different in order to match with the corresponding wheel treads.

An advantage of this arrangement is that the shuttle only needs two wheel axes in order to ride on both the track crossing and storage track thereby saving parts and costs.

The axes may comprise each two wheels. A first wheel of these two wheels comprises respectively the first tread or third tread and a second wheel of these two wheels comprises respectively the second tread or fourth tread.

In other words, there are two separate wheels on each axis, one wheel for each tread.

Alternatively, the axes may comprise each one wheel wherein each one wheel comprises respectively the first and second tread or the third and fourth tread.

In other words, there is a single wheel on each axis where one part of the wheel's surface functions as the first or third tread and another part of the wheel's surface functions as the second or fourth tread.

According to a second aspect, the invention relates to a method for driving a multi-directional load carrying shuttle in an automated warehouse storage system from a track crossing of an aisle track onto a storage track for accessing storage space. The aisle track is decoupled from the storage track by a discontinuity between the track crossing and the storage track. The track crossing further bends downwards towards the discontinuity for engaging the first and third tread with the storage track in a continuous manner. Alternatively or complimentary, the storage track bends downwards towards the discontinuity for engaging the first and third tread with the storage track in a continuous manner. The method further comprises the following steps:

driving the shuttle on the aisle track to the track crossing,
driving the shuttle onto the track crossing towards this discontinuity by a second and fourth wheel tread on each side of the shuttle,
at the discontinuity, engaging a first wheel tread with the storage track before the second tread disengages with the track crossing thereby overcoming the discontinuity,
subsequently, engaging a third wheel tread with the storage track before the fourth tread disengages with the track crossing,
driving the shuttle towards the storage space on the storage track by the first and third wheel tread.

According to a third aspect, the invention relates to a storage rack for an automated warehouse storage system comprising:

a storage track for accessing storage space by a multi-directional load carrying shuttle; and
an aisle track comprising a track crossing for accessing said storage track by said multi-directional load carrying shuttle The aisle track is further decoupled from the storage track by a discontinuity between the track crossing and the storage track. The track crossing may further bend downwards towards the discontinuity for engaging a first and third tread of the multi-directional load carrying shuttle with the storage track in a continuous manner and/or the storage track may bend downwards towards the discontinuity for engaging the first and third tread with the storage track in a continuous manner.

DETAILED DESCRIPTION OF EMBODIMENT(S)

The present invention relates to a multi-directional warehouse shuttle and related aisle and storage tracks on which the shuttle rides in order to fetch or transport loads across a storage level of a warehouse storage rack.

FIG. 1A to FIG. 1E illustrate such a shuttle 130 and track configuration according to a first embodiment of the invention. The shuttle 130 is configured to ride along an aisle track 106, running along the x-direction. At different positions along the aisle track 106, there are track crossings 105. The track crossings are arranged such that rails of the aisle track cross the rails of the track crossing. The track crossing 105 typically runs in a direction substantially orthogonal to the aisle track 106, i.e., along the z-direction.

By the track crossing, the shuttle 130 may change direction, i.e., change between the x- and z-direction. In order to do so, the shuttle 130 stops at a crossing in the aisle track 106 and then rides onto the rails of the track crossing 105. The track crossing 105 allows the shuttle to access the storage track 110. The storage track 110 is arranged in the same direction as the track crossing 105, i.e., the z-direction.

Figure 1A:
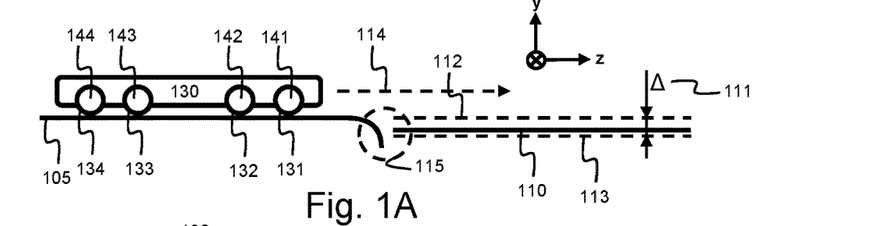
FIG. 1A illustrates a side view of a warehouse shuttle, a track crossing and a storage track of an automated warehouse storage system according to an embodiment of the invention.

The track crossing 105 and storage track 110 are spaced apart by a discontinuity 115, i.e., there is no rail or track portion in between the track crossing and storage track. Because of this, the rails of the track crossing 105 and storage track 110 do not need to be aligned precisely with respect to each other as the rails do not need to be connected to each other. This allows a tolerance 111 in height in the placement of the storage track 110 with respect to the track crossing 105. In FIG. 1A, the maximum height of the storage track 110 is indicated by the dashed line 112 corresponding substantially with the level of the track crossing. The minimum height of the storage track 110 is indicated by the dashed line 113.

Because of the discontinuity 115 between the track crossing 105 and storage track 110, a shuttle with two wheel treads per side would not be able to access the storage track 110 in a smooth and continuous matter as the wheel would get trapped in the gap created by this discontinuity 115.

To overcome this discontinuity, a shuttle 130 is provided with four wheels 141-144 on each side of the shuttle 130, i.e., on the sides of shuttle 130 with respect to the riding direction 114 of the shuttle 130 on the storage track and thus the track crossing. Each wheel 141-144 comprises a respective wheel tread 131-134. The bottom surface of all wheels 141-144 is arranged inline such that all four wheel treads 131-134 are used when riding on the track crossing 105 and when riding on the storage track 110.

Figure 1B:
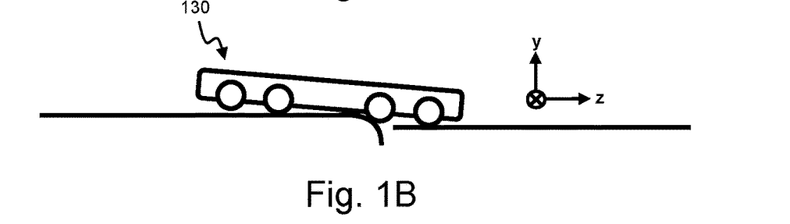
FIG. 1B illustrates the same embodiment as in FIG. 1A where the shuttle is on the transition between the track crossing and the storage track.

FIG. 1A to FIG. 1D illustrate different positions of the shuttle 130 when it rides from the track crossing onto the storage track thereby overcoming the discontinuity 115. In FIG. 1A, the shuttle is completely on the track crossing by all its four wheels 141-144 and thus by all its four wheel treads 131-134 on each side. Then, when arriving at the discontinuity 115, as illustrated in FIG. 1B, the first front wheel 141 disengages from the track crossing 105. Subsequently, the second front wheel 142 rolls from the track crossing, i.e., it disengages from the track crossing. Before this second front wheel 142 drops into the discontinuity 115, the first front wheel 141 makes contact with the storage track, i.e., it engages with the storage track 110. This way, the front of the shuttle is moved from the track crossing onto the storage track in an continuous manner.

Figure 1C:
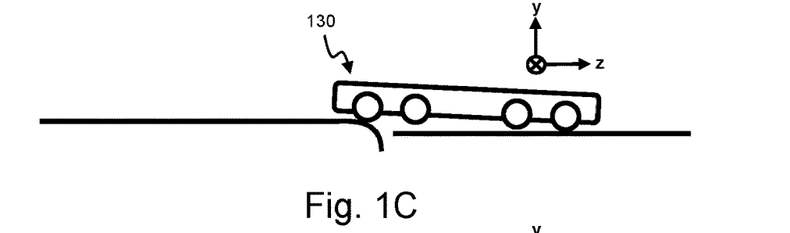
FIG. 1C illustrates the same embodiment as in FIG. 1A where the shuttle is at the end of the transition between the track crossing and the storage track.
Figure 1D:
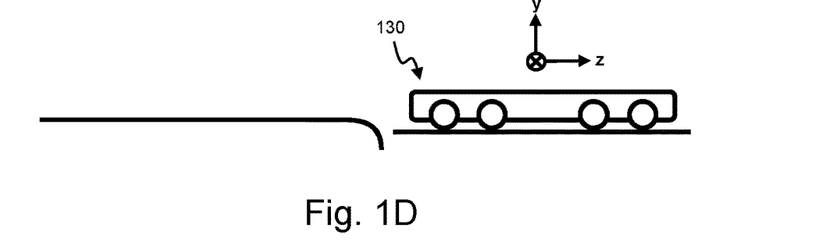
FIG. 1D illustrates the same embodiment as in FIG. 1A where the shuttle is on the storage track.
Figure 1E:
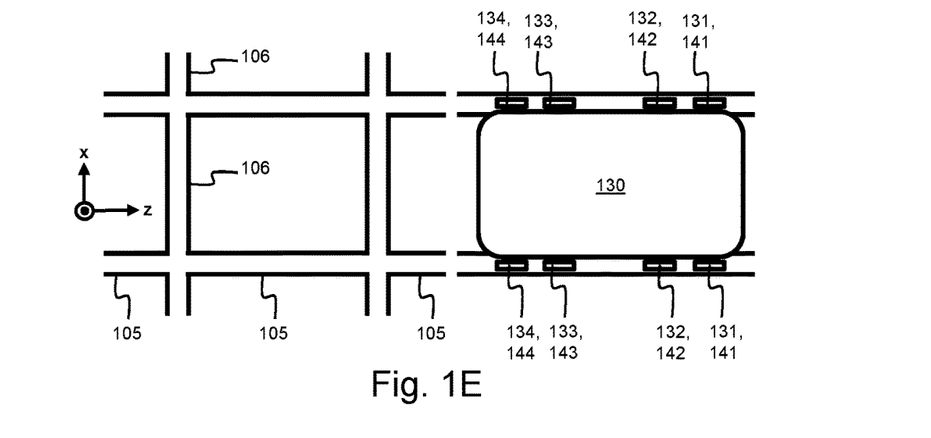
FIG. 1E illustrates a top view of the system of FIG. 1D.

Then, as illustrated in FIG. 1C and FIG. 1D, the same is done with the back wheels 143 and 144. First the first back wheel 143 will disengage from the track crossing such that the back of the shuttle is only supported by the second back wheel 144 on the track crossing. Then, this second back reaches the end of the track crossing and moves downwards because of the discontinuity by which the first back wheel 143 makes contact with the storage track. Shortly after, the situation as depicted in FIG. 1D is reached where the shuttle is supported by all four wheel treads 131-134 on the storage track 110.

The track crossing 105 bends downwards near the discontinuity such that the wheels of the shuttle engage with the storage track in a smooth and continuous way. In order to achieve this smooth engagement, the track crossing preferably bends down up to or beyond the minimum allowed height 113 of the storage track. This way, the shuttle does not exhibit a discrete step downwards when the second front wheel 142 and thus second front tread 132 rides of the track crossing. The bend also allows a smooth transition when the shuttle moves back from the storage track onto the track crossing. This way, the shuttle does not have to overcome a discrete step upwards when the back wheel 144 hits the track crossing 105 when riding from the storage track 110 onto the track crossing.

Figure 4:
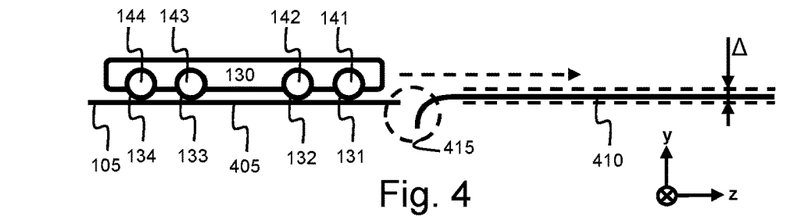
FIG. 4 illustrates a alternative embodiment of the system illustrated in FIG. 1A to FIG. 1E where the storage track bends downwards to the track crossing.

FIG. 4 illustrates an alternative configuration of the embodiment of FIG. 1A to FIG. 1D. The shuttle 130 is kept the same, but the tracks are arranged in an opposite way. In this case, the storage track 410 is positioned at least at the same height as the track crossing 405 as indicated by the dashed line 413 and has to remain within a certain tolerance 411. The storage track 410 now bends downwards near the discontinuity 415 towards the track crossing 405. This embodiment is actually equivalent to the first embodiment where the track crossing 105 corresponds to the storage track 410 and the storage track 110 corresponds to the track crossing 405.

FIG. 2A to FIG. 2D illustrate a shuttle 230 and track configuration according to a second embodiment of the invention. The shuttle 230 is configured to ride along an aisle track 206, indicated as the x-direction. At different positions along the aisle track 206, there are track crossings 205. The track crossings are arranged such that rails of the aisle track cross the rails of the track crossing.

Figure 2A:
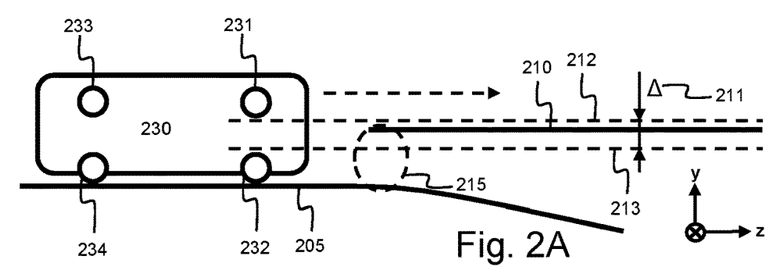
FIG. 2A illustrates a side view of a warehouse shuttle, a track crossing and a storage track of an automated warehouse storage system according to an embodiment of the invention.

The track crossing 205 and storage track 210 are spaced apart by a discontinuity 215, i.e., there is an offset 215 in height between rails of the track crossing 205 and the rails of the storage track 210. Because of this offset, the rails of the track crossing 205 and storage track 210 do not need to be aligned precisely with respect to each other as the rail do not need to be connected to each other. This allows a tolerance 211 in height in the placement of the storage track 210 with respect to the track crossing 205. In FIG. 2A, the maximum height of the storage track 210 is indicated by the dashed line 212 corresponding substantially with the level of the track crossing. The minimum height of the storage track 210 is indicated by the dashed line 213.

Shuttle 230 is arranged to ride on both the track crossing 205 and storage track 210. A lower set of wheels 242, 244 on each side of the shuttle 230 is used to ride on the track crossing 205. Each wheel 242, 244 comprises a respective wheel tread 232, 234 for making contact with the track crossing 205. Shuttle 230 thus rides on the track crossing 205 by this first lower set of wheels 242, 244 as depicted in FIG. 2A. Shuttle 230 further comprises a higher set of wheels 241, 243 on each side of the shuttle 230 for riding on the storage track 210. Each wheel 241, 243 comprises a respective wheel tread 231, 233 for making contact with the storage track 210.

The height of the higher set of wheels is chosen such that the shuttle 230 can ride from the track crossing 205 onto the storage track 210 for every height of the storage track within the tolerance 211.

Figure 2B:
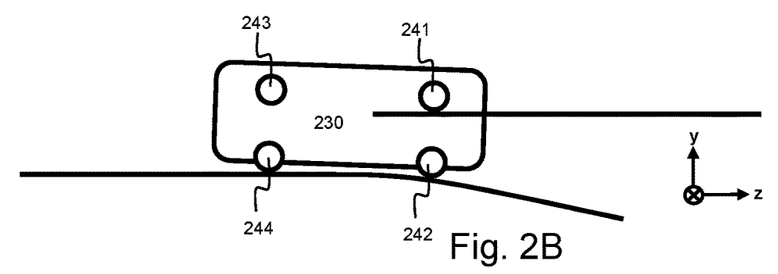
FIG. 2B illustrates the same embodiment as in FIG. 2A where the shuttle is on the transition between the track crossing and the storage track.
Figure 2C:
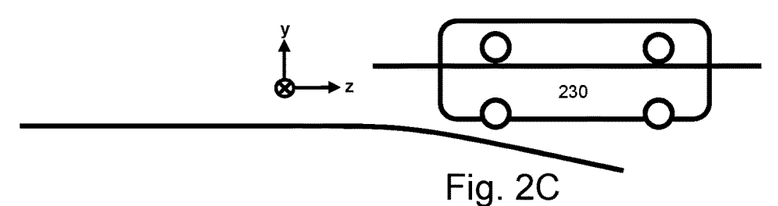
FIG. 2C illustrates the same embodiment as in FIG. 2A where the shuttle is on the storage track.
Figure 2D:
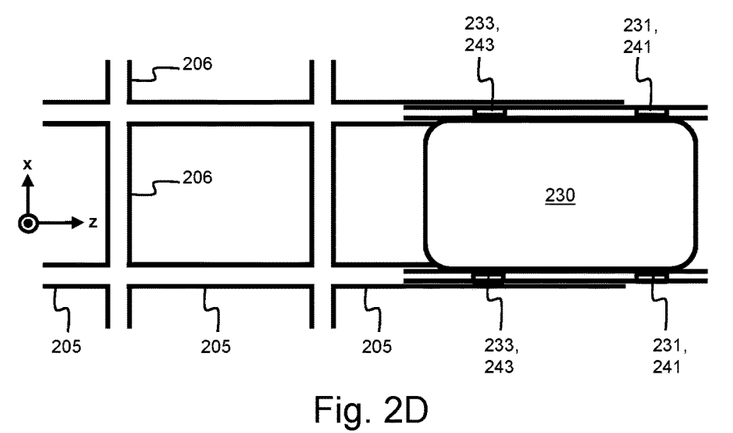
FIG. 2D illustrates a top view of the system of FIG. 2C.

FIG. 2A to FIG. 2C illustrate different positions of the shuttle 230 when it rides from the track crossing onto the storage track thereby overcoming the discontinuity 215. In FIG. 2A, the shuttle is completely on the track crossing 205 by it set of lower wheels 242-244 and thus wheel treads 232-234. Then, when arriving at the discontinuity 215, as illustrated in FIG. 1B, shuttle 230 starts riding downwards by the bend in the track crossing 205. By this downward movement, the first wheel 241 of the higher set of wheels engages with the storage track 210. At the same time, the first wheel 242 of the lower set of wheels disengages from the track crossing. The same then happens with the back wheels of the shuttle 230. First, the second wheel 244 of the lower set of wheels arrives at the bend in the track crossing 205 and, thus, the shuttle start moving downwards again. By this downwards movement, the second wheel 243 of the higher set of wheels engages with the storage track 210 while the second wheel 244 of the lower set of wheels disengages with the track crossing 205. Finally, as depicted in FIG. 2C, the shuttle 230 is now completely riding on the storage track by its higher set of wheels 241, 243.

To move the shuttle from the storage track 210 to the track crossing 205, the opposite sequence is followed as depicted from FIG. 2C to FIG. 2A.

Figure 5:
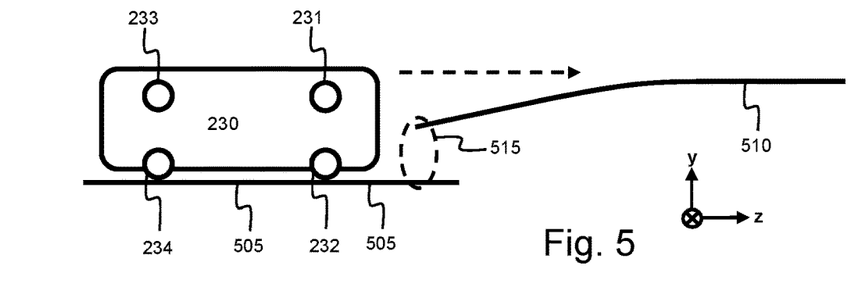
FIG. 5 illustrates a alternative embodiment of the system illustrated in FIG. 2A to FIG. 2D where the storage track bends downwards to the track crossing.

FIG. 5 illustrates an alternative configuration of the embodiment of FIG. 2A to FIG. 2D. The shuttle 230 is kept the same, but the tracks are arranged in an opposite way. In this case, the storage track 510 bends down towards the track crossing 505 near the discontinuity 515. This way, when driving the shuttle 230 from the track crossing 505 onto the storage track, the first wheel 241 of the higher wheel set engages with the storage track. Then, shuttle 230 moves upwards by the bend in the storage track 510 causing the first wheel 242 of the lower wheel set to disengage from the track crossing. The same action repeats for the back wheels 244, 243 of the respective lower and higher set of wheels.

A particular advantage of the second embodiment and its alternative is that the height of the rails of the storage track is not dependent on the height of the shuttle but on the height between the higher set of wheels 241, 243 and the top of the shuttle 230. As the loads are typically stored on the top side of the rails of the storage track, shuttle 230 needs to move underneath the load on a lower portion of the rails. The height of the rail then determines the allowable height of the shuttle. In order to achieve this, the rails of the storage track may have a Z- or C-profile where the loads are stored on the upper horizontal member of the profile and the shuttle rides on the lower horizontal member of the Z- or C-profile. As shuttle 230 rides on the storage track 510, 210 by the higher wheels 231, 233, the height of the rail is only determined by the height between the higher wheels and the top of the shuttle 230. This allows using lower profiles and, thus, saving cost.

FIG. 3A to FIG. 3D illustrate a shuttle 330 and track configuration according to a third embodiment of the invention. The shuttle 330 is configured to ride along the aisle track 306, indicated as the x-direction. At different positions along the aisle track 306, there are track crossings 305. The track crossings are arranged such that rails of the aisle track 306 cross the rails of the track crossing 305.

Figure 3A:
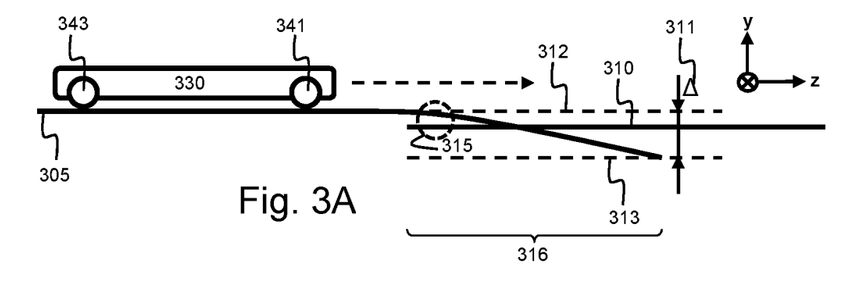
FIG. 3A illustrates a side view of a warehouse shuttle, a track crossing and a storage track of an automated warehouse storage system according to an embodiment of the invention.

The track crossing 305 and storage track 310 are spaced apart by a discontinuity 315, i.e., there is an offset 315 in width between rails of the track crossing 305 and the rails of the storage track 310. Because of this offset, the rails of the track crossing 305 and storage track 310 do not need to be aligned precisely with respect to each other as the rails do not need to be connected to each other. This allows a tolerance 311 in height in the placement of the storage track 310 with respect to the track crossing 305. In FIG. 3A, the maximum height of the storage track 310 is indicated by the dashed line 312. The minimum height of the storage track 310 is indicated by the dashed line 313.

Shuttle 330 is arranged to ride on both the track crossing 305 and storage track 310. Shuttle 330 comprises a front wheel axis 350 and a rear wheel axis 351. The front wheel axis comprises an inner wheel 342 and an outer wheel 341 on each side of the shuttle. The rear wheel axis comprises an inner wheel 344 and an outer wheel 343 on each side of the shuttle. Wheels 341-344 each comprise a respective wheel tread 331-334 for riding on the tracks 305 and 310.

The track crossing 305 is arranged such that the shuttle 330 rides on it by its inner wheels 342, 344. The storage track 310 is arranged such that the shuttle 330 rides on it by its outer wheels, 341, 343. Thus, as depicted in FIG. 3D, the rails of the storage track 310 are further apart than the rails of the track crossing thereby creating the discontinuity 315. Towards the discontinuity, the track crossing bends downwards and then runs downwards by a downward portion 316. In the region of the downward portion 316, the track crossing 305 overlaps with the storage track 310. The storage track is still within the tolerance 311 as long as the storage track 310 overlaps with the track crossing 305 along the downward portion 316. When the storage track is within tolerance, the shuttle 330 may move from the track crossing 305 to the storage track 310 in a smooth and continuous manner.

Figure 3B:
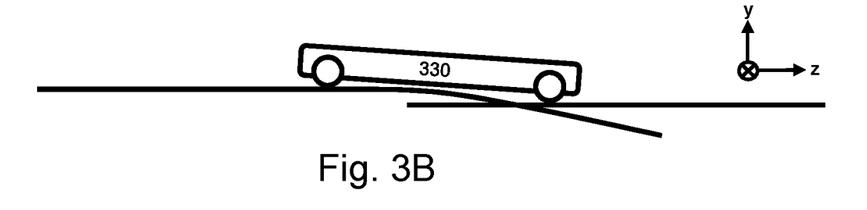
FIG. 3B illustrates the same embodiment as in FIG. 3A where the shuttle is on the transition between the track crossing and the storage track.
Figure 3C:
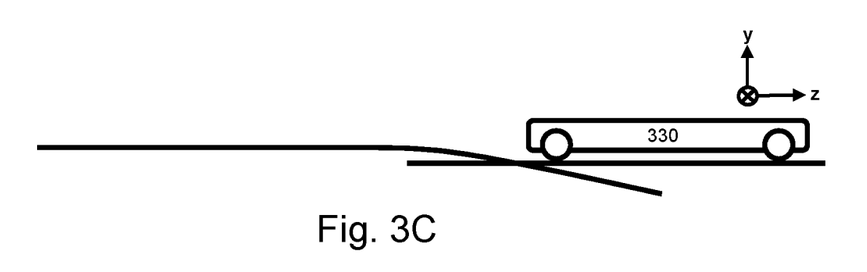
FIG. 3C illustrates the same embodiment as in FIG. 3A where the shuttle is on the storage track.
Figure 3D:
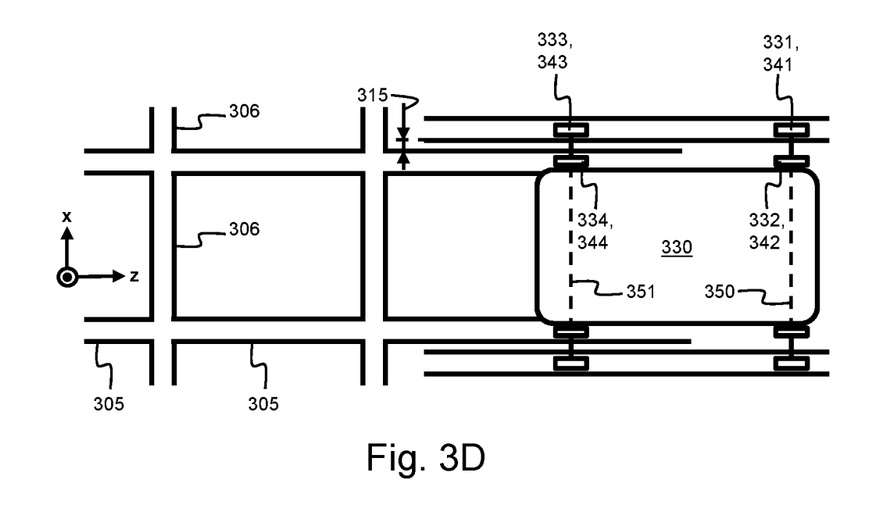
FIG. 3D illustrates a top view of the system of FIG. 3C.

FIG. 3A to FIG. 3C illustrate different positions of the shuttle 330 when it rides from the track crossing 305 onto the storage track 310 thereby overcoming the discontinuity 315. In FIG. 3A, the shuttle is completely on the track crossing 305 by its set of inner wheels 342-344 and thus wheel treads 332-334. Then, when arriving at the discontinuity 315, as illustrated in FIG. 1B, shuttle 330 starts riding downwards on the downwards portion 316 of the track crossing 305. By this downward movement, the first wheel 341 of the outer set of wheels engages with the storage track 310. At the same time, the first wheel 342 of the lower set of wheels disengages from the track crossing 305. The same then happens with the back wheels of the shuttle 330. First, the rear wheel 344 of the inner set of wheels arrives at the bend in the track crossing 305 and, thus, the shuttle starts moving downwards again on the downward portion 316 of the track crossing 305. By this downwards movement, the rear wheel 343 of the outer set of wheels engages with the storage track 310 while the second wheel 344 of the inner set of wheels disengages with the track crossing 305. Finally, as depicted in FIG. 3C, the shuttle 330 is now completely riding on the storage track 310 by its outer set of wheels 341, 343.

To move the shuttle from the storage track 310 to the track crossing 305, the opposite sequence is followed as depicted from FIG. 3C to FIG. 3A.

Figure 6:
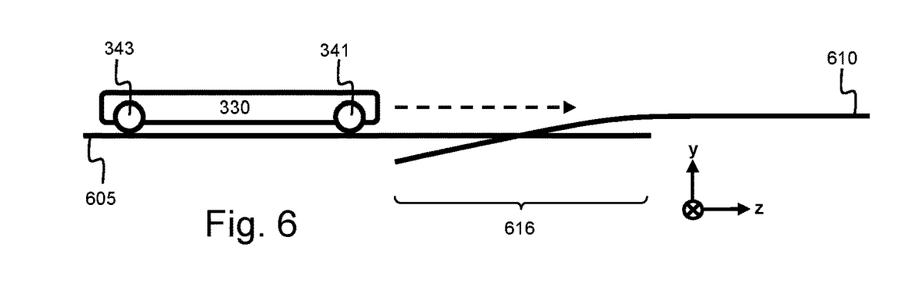
FIG. 6 illustrates a alternative embodiment of the system illustrated in FIG. 3A to FIG. 3D where the storage track bends downwards to the track crossing.

FIG. 6 illustrates an alternative configuration of the embodiment of FIG. 3A to FIG. 3D. The shuttle 330 is kept the same, but the track crossing 605 and storage track 610 are arranged in an opposite way. In this case, the storage track 610 bends down towards the track crossing near the discontinuity over a downward portion 616. This way, when driving the shuttle 330 from the track crossing 605 onto the storage track 610, the first wheel 341 of the outer wheel set engages with the storage track 610. Then, shuttle 330 moves upwards on the downward portion 616 of the storage track 610 causing the first inner wheel 342 to disengage from the track crossing 605. The same action repeats for the rear wheels 344, 343 of the respective inner and outer wheels.

Figure 7:
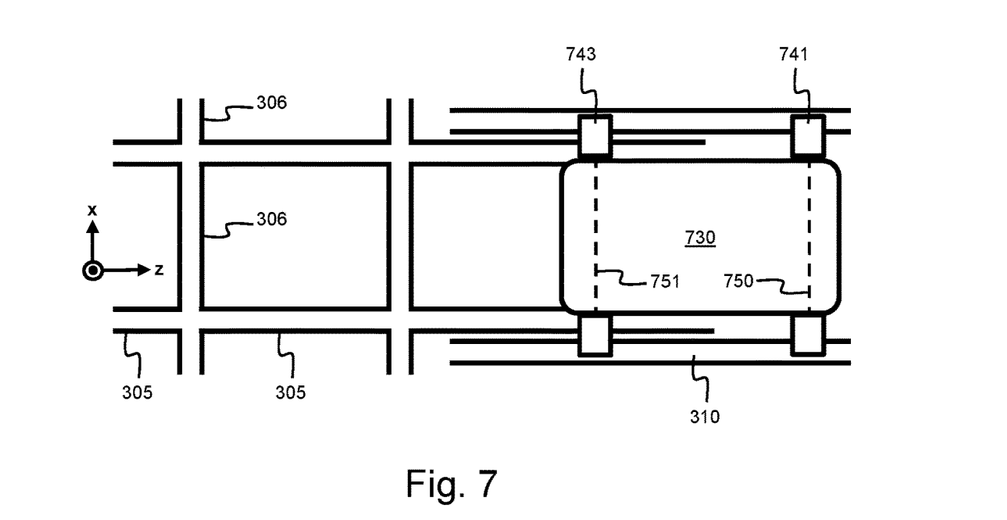
FIG. 7 illustrates a alternative embodiment of the system illustrated in FIG. 3A to FIG. 3D where wheel treads on a same wheel axis are embodied on a single wheel.
Figure 8A:
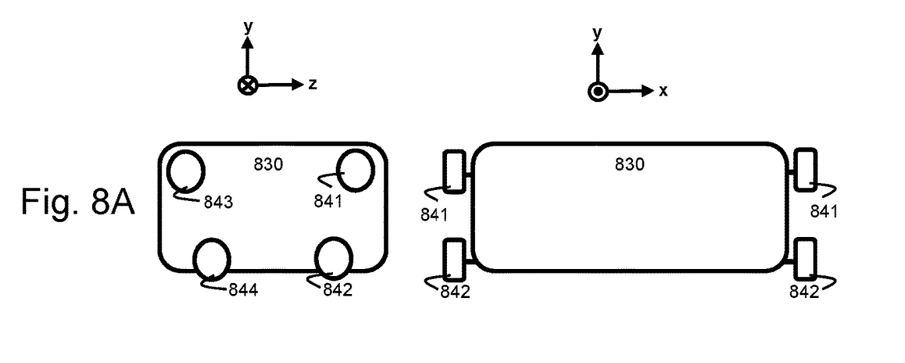
FIG. 8A to FIG. 8K each illustrate a side view and front view of a warehouse shuttle according to further embodiments of the invention.
Figure 8B:
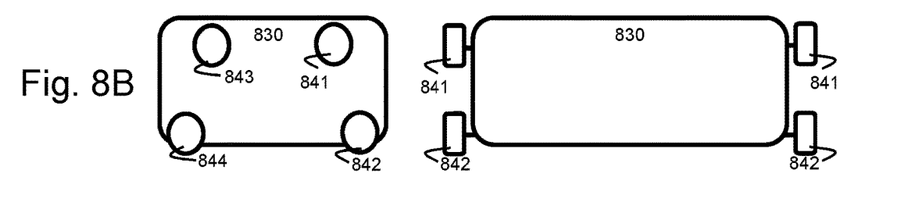
Figure 8C:
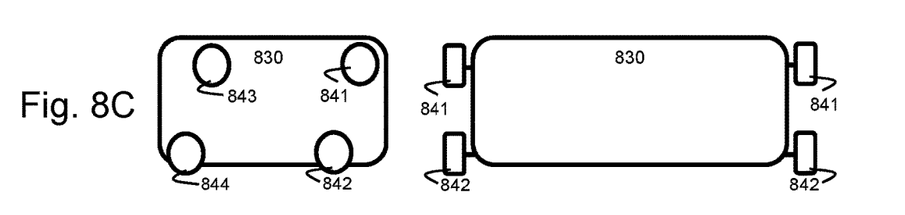
Figure 8D:
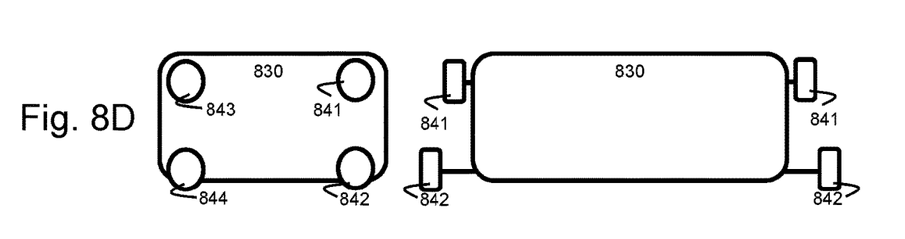
Figure 8E:
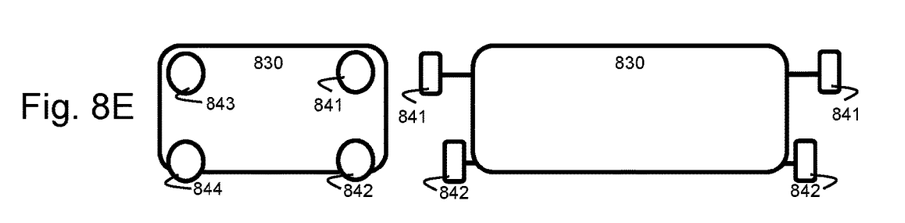
Figure 8F:
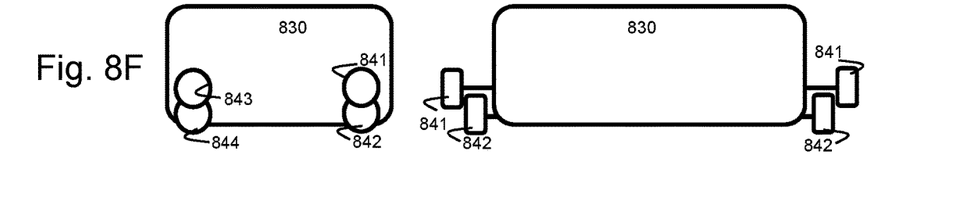
Figure 8G:
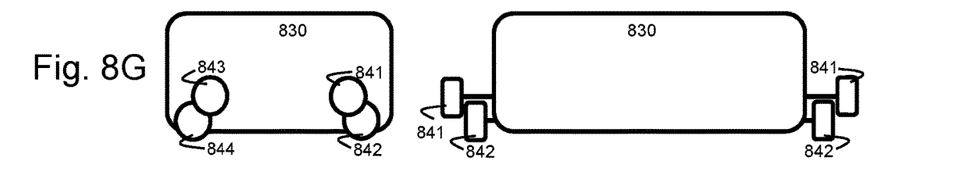
Figure 8H:
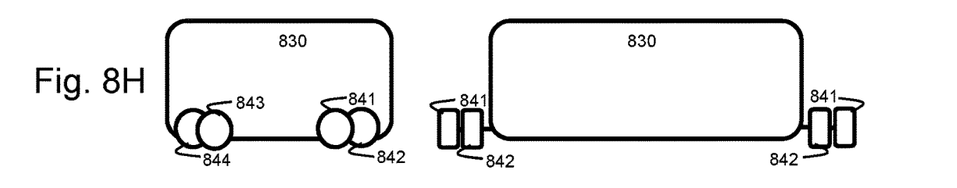
Figure 8I:
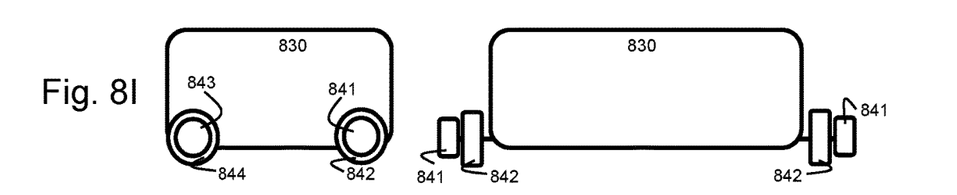
Figure 8J:
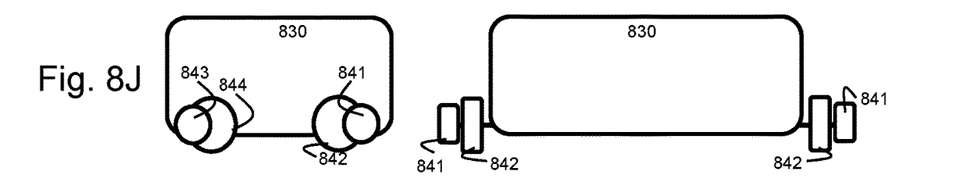
Figure 8K:
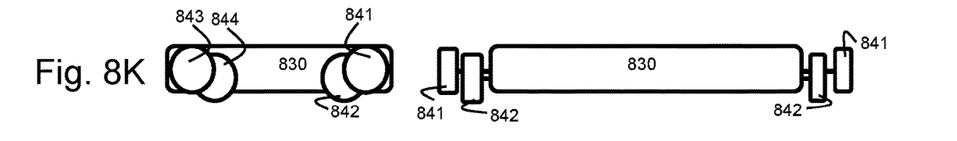

FIG. 7 illustrates a further alternative embodiment to the embodiment of FIGS. 3 and 6. In this case, the front axis 750 and rear axis 751 of shuttle 730 each comprise respectively one wheel 741, 743 on each side. The wheels are made wide enough such that they cover both the track crossing 305 as well as the storage track 310. When riding on the track crossing, the inner wheel tread of the wheels 741 and 743 are used and when riding the storage track the outer wheel tread of the same wheels are used.

The different arrangements of the wheel treads of the shuttle for riding on the track crossing and storage track according to the above embodiments may also combined or altered. FIG. 8A to FIG. 8K illustrate different arrangements of wheels 841 to 844 of a warehouse shuttle 830. Wheels 841 and 843 are the respective front and rear wheels of the shuttle 830 for riding on the storage track. Wheels 842 and 844 are the respective front and rear wheels of the shuttle 830 for riding on the track crossing. For each of the wheel arrangements, a respective arrangement of the track crossing and storage track may be provided such that they are separated by a discontinuity and such that a smooth and continuous transition is obtained when riding from the track crossing onto the storage track and when riding from the storage track onto the track crossing. In each of the FIG. 8A to 8K, the left drawing represents a side view of the shuttle 830, i.e., the y-z plane when looking in the x-direction; the right drawing represents a front view of the shuttle, i.e., the y-x plane when looking opposite to the z-direction.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An automated warehouse storage system comprising:
   a storage track for accessing storage space; and
   an aisle track comprising a track crossing for accessing said storage track; and
   a multi-directional load carrying shuttle adapted to ride on both said storage track and said aisle track;
   wherein said aisle track is decoupled from said storage track by a discontinuity between said track crossing and said storage track; and
   wherein said shuttle comprises at least four wheel treads per side for driving said shuttle along a direction of said storage track; and
   wherein said four wheel treads are configured such that, when riding from said crossing onto said storage track:
   a first tread engages with said storage track before a second tread disengages with said track crossing thereby overcoming said discontinuity; and
   a third tread engages with said storage track before a fourth tread disengages with said track crossing; and
   wherein said track crossing bends downwards towards said discontinuity for engaging said first and third tread with said storage track in a continuous manner and/or wherein said storage track bends downwards towards said discontinuity for engaging said first and third tread with said storage track in a continuous manner.

2. The system according to claim 1 wherein said shuttle comprises at least four wheels per side each comprising a respective tread of said four wheel treads; and
   wherein said four wheels are configured in line such that said shuttle rides on said four wheels on both a rail of said track crossing and a rail of said storage track.

3. The system according to claim 1 wherein said shuttle is configured to ride on said storage track by said first tread and said third tread; and
   wherein said shuttle is configured to ride on said rail crossing by said second tread and said fourth tread.

4. The system according to claim 3 wherein said track crossing and said storage track are overlapping along a direction of said storage track.

5. The system according to claim 3 wherein said shuttle comprises at least four wheels per side each comprising a respective tread of said four wheel treads; and
   wherein a first and third wheel comprising respectively said first and third tread are positioned higher on said shuttle than a second and fourth wheel comprising respectively said second and fourth tread.

6. The system according to claim 3 wherein said shuttle comprises two wheel axes each comprising one or more wheels; and
   wherein said first and said second tread are on said one or more wheels of a first wheel axis; and
   wherein said third and fourth tread are on said one or more wheels of a second wheel axis.

7. The system according to claim 6 wherein said axes comprise each two wheels; and
   wherein a first wheel of said two wheels comprises respectively said first tread or third tread; and
   wherein a second wheel of said two wheels comprises respectively said second tread or fourth tread.

8. The system according to claim 6 wherein said axes comprise each one wheel; and
   wherein said wheel comprises each respectively said first and second tread or said third and fourth tread.

9. A method for driving a multi-directional load carrying shuttle in an automated warehouse storage system from a track crossing of an aisle track onto a storage track for accessing storage space;
   wherein said aisle track is decoupled from said storage track by a discontinuity between said track crossing and said storage track; and
   wherein said track crossing bends downwards towards said discontinuity for engaging said first and third tread with said storage track in a continuous manner and/or wherein said storage track bends downwards towards said discontinuity for engaging said first and third tread with said storage track in a continuous manner;
   said method comprising the following steps:
   driving said shuttle on said aisle track to said track crossing; and
   driving said shuttle onto said track crossing towards said discontinuity by a second and fourth wheel tread on each side of said shuttle; and
   at said discontinuity, engaging a first wheel tread with said storage track before said second tread disengages with said track crossing thereby overcoming said discontinuity; and
   subsequently, engaging a third wheel tread with said storage track before said fourth tread disengages with said track crossing;
   driving said shuttle towards said storage space on said storage track by said first and third wheel tread.

10. A storage rack for an automated warehouse storage system comprising:
- a storage track for accessing storage space by a multi-directional load carrying shuttle; and
- an aisle track comprising a track crossing for accessing said storage track by said multi-directional load carrying shuttle; and
- wherein said aisle track is decoupled from said storage track by a discontinuity between said track crossing and said storage track; and
- wherein said track crossing bends downwards towards said discontinuity for engaging a first and third tread of said multi-directional load carrying shuttle with said storage track in a continuous manner and/or wherein said storage track bends downwards towards said discontinuity for engaging said first and third tread with said storage track in a continuous manner.

* * * * *